(No Model.)

J. H. BUSSARD.
ANIMAL TRAP.

No. 266,605. Patented Oct. 31, 1882.

Witnesses:
Phil C. Dietrich
J. R. Littell

Inventor:
J. H. Bussard,
by C. A. Snow & Co.
Attorneys.

UNITED STATES PATENT OFFICE.

JOSEPH H. BUSSARD, OF HARMONY, MARYLAND.

ANIMAL-TRAP.

SPECIFICATION forming part of Letters Patent No. 266,605, dated October 31, 1882.

Application filed August 19, 1882. (No model.)

*To all whom it may concern:*

Be it known that I, JOSEPH H. BUSSARD, of Harmony, in the county of Frederick and State of Maryland, have invented certain new and useful Improvements in Animal-Traps; and I do hereby declare that the following is a full, clear, and exact description of the invention, which will enable others skilled in the art to which it appertains to make and use the same, reference being had to the accompanying drawings, which form a part of this specification.

This invention relates to animal-traps, and has for its object to provide a simple and efficient device that will operate automatically and surely.

To this end it consists in certain improvements in the construction and operation.

Figure 1:
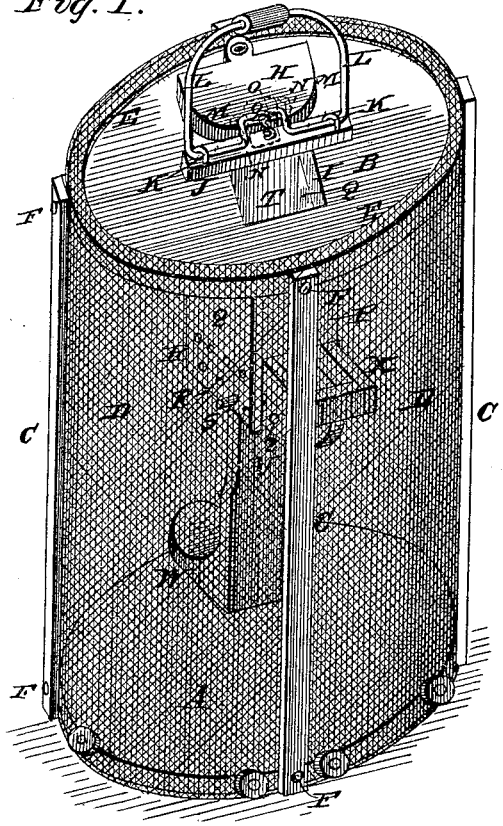
Figure 2:
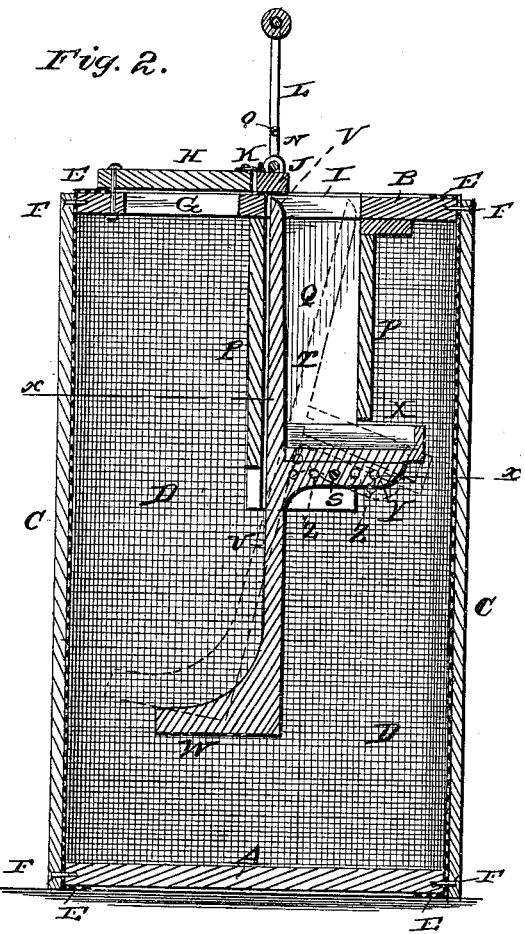
Figure 3:
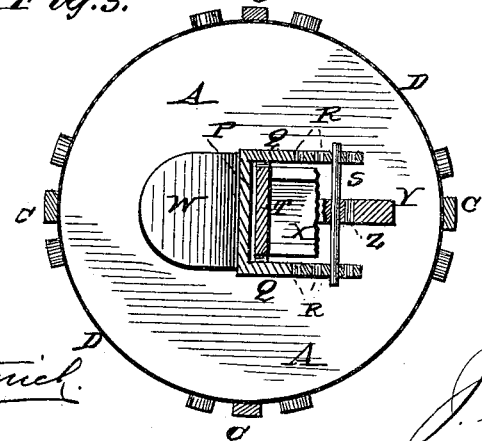

In the drawings, Figure 1 is a perspective view of my improved trap; Fig. 2, a vertical sectional view; Fig. 3, a horizontal sectional view on the line $x\ x$, Fig. 2.

Referring to the drawings, A designates the bottom and B the top pieces of my improved trap. These pieces are connected by longitudinal strips C, the intervening space being inclosed by a wire net-work, D, bent around over the pieces A and B, as shown at E E, and held in place by strips C, in connection with auxiliary fastening nails or screws F. The bottom A is preferably imperforate; but top B has an exit-opening, G, closed by a cap or cover, H. Top B is also provided with a rectangular entrance-opening, I, across one end of which is arranged an overhanging cross-piece, J, having preferably staples K K for a bail, L. The latter consists of a single piece of elastic wire bent through the staples to a substantially-rectangular form, and having its inner bottom spring ends, M M, between the staples, bent up, as at N N, and provided with inturned ends O O, adapted to clasp a bait. From opening I depends a rectangular housing or boxing, consisting of walls P P and Q Q, in the latter pair being formed a series of perforations, R, for a transverse pivot pin or shaft, S.

T is a lever, forming a door to opening I. It comprises a back strip, U, beveled at its upper end, V, and weighted at its lower end, W. Its upper end, V, is normally hid from the notice of the animal by overhanging strip J, which thereby serves to prevent the animal from prematurely turning the lever over and closing the opening. Lever T is provided about midway with a box-platform, X, in which may be placed bait, under said box being arranged a supporting-piece, Y, having a series of perforations, Z, for pivot-pin S, forming the fulcrum of lever T.

The operation and advantages of my invention will be readily understood. The animal, enticed by the bait outside, is drawn to the opening I, from whence he jumps onto platform X, which will throw the end V of lever T over, as shown in dotted lines, Fig. 2, closing the same. The animal is then obliged to jump out onto the bottom A, bait being placed on the latter, and the lever T, by reason of its weighted end, will at once return to its normal position, ready to entrap the next animal.

My improved trap is very simple and convenient, and is especially adapted to trapping small animals, such as rabbits, squirrels, rats, &c.

I claim as new—

1. An animal-trap provided with a bail formed of a single piece of spring-wire bent round and having its spring ends M bent up, and provided with inturned ends O to clasp a bait, as set forth.

2. The combination, with top B, having an entrance-opening, I, at one end of which is arranged a cross-strip, J, provided with staples K K, of the bail, formed of elastic wire, having upturned ends M M, provided with inturned points O O to clasp a bait, as set forth.

3. The combination of imperforate bottom A, top B, having exit-opening G, and entrance-opening I, with depending rectangular housing having perforations R, wire-netting D, securing longitudinal strips C, cross-piece J, overhanging opening I, lever T, having beveled top end, V, weighted lower end, W, box X, and piece Y, having perforations Z, and transverse pivot pin or shaft S, as set forth.

In testimony that I claim the foregoing as my own I have hereto affixed my signature in presence of two witnesses.

JOSEPH HAMILTON BUSSARD.

Witnesses:
 W. IRVING PARSONS,
 H. CLAY HULL.